Oct. 4, 1966     T. T. LEE     3,276,414
MARINE FENDER
Filed April 27, 1965
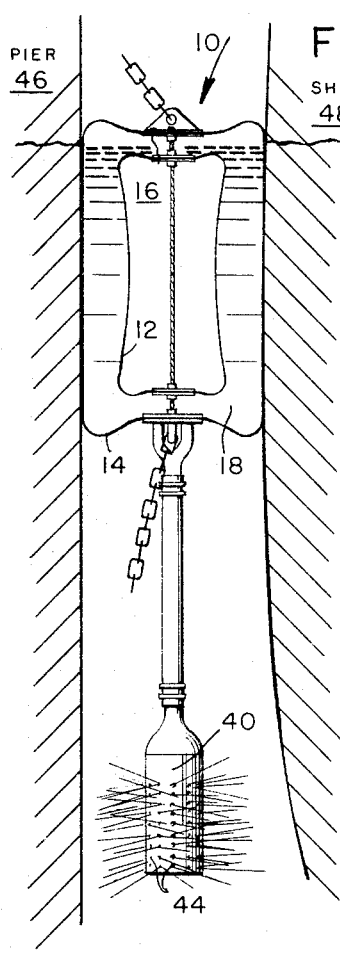
FIG. 1.
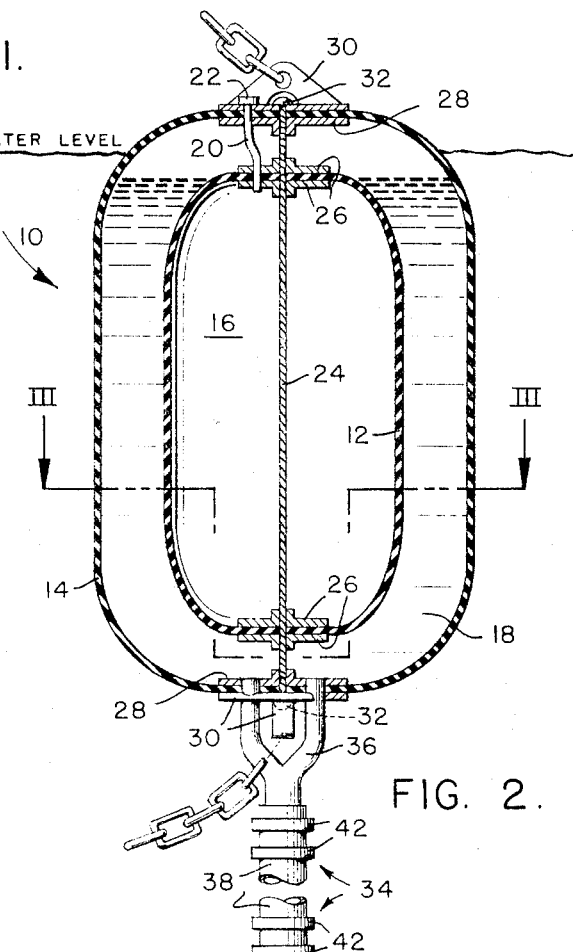
FIG. 2.
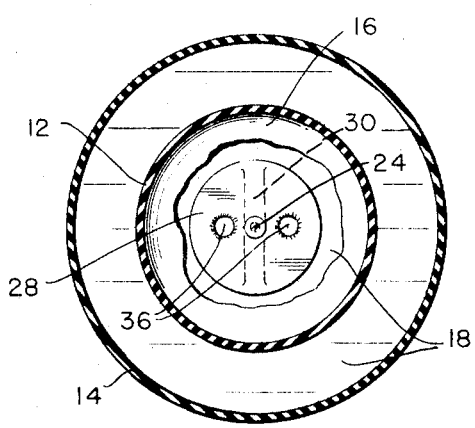
FIG. 3.
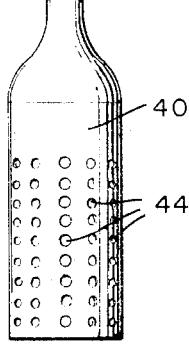
INVENTOR.
THEODORE T. LEE
BY
Ervin F. Johnston
ATTORNEY.

United States Patent Office 3,276,414
Patented Oct. 4, 1966

3,276,414
MARINE FENDER
Theodore T. Lee, Oxnard, Calif., assignor to the United States of America as represented by the Secretary of the Navy
Filed Apr. 27, 1965, Ser. No. 451,360
10 Claims. (Cl. 114—219)

The invention described herein may be manufactured and used by or for the Government of the United States of America for governmental purposes without the payment of any royalties thereon or therefor.

The present invention relates to a marine fender and more particularly to a marine fender which employs both hydraulic and pneumatic principles.

Marine fenders and camels are ancient in the art for cushioning the shock of a ship when it comes alongside a wharf or pier. The impact loads absorbed by these fenders vary considerably depending upon the size of the ship and the speed with which it is approaching the pier. In many instances the speed of the ship is very difficult to control because of high wind and current conditions. It is highly desirable that marine fenders be capable of absorbing high impact loads without damaging either the pier or the ship's hull.

The rope woven type of camel has not been satisfactory for preventing damage to ships and piers because of its lack of resiliency. Accordingly, many piers are now using pneumatic bags which are large rubber casings filled with air so that ships being berthed are air cushioned when coming alongside. This type of marine fender has prevented much damage, however when subjected to high impact loading, the high air pressure has caused these rubber bags to burst. The United States Navy has experienced much difficulty with the pneumatic type of marine fender because of its tendency to burst and has been subjected to heavy expenditures to repair these fenders by a vulcanizing process.

Another type of marine fender which has been used to some extent has been the hydraulic type which is a rubber casing partially filled with water with a means for allowing the water to escape from the rubber casing when subjected to a loading condition. These types of marine fenders are capable of absorbing high energy only when the impact is fast and therefore they are desirable when a large ship is berthing at a high rate of speed. These types of marine fenders are much harder to burst because of the pressure relief action of the water as it escapes from the fender. Once the ship is berthed however, these types of fenders do not adequately protect the ship from the pier since the force of the ship keeps the fender in a squeezed down condition and the only resiliency afforded is by the wall thickness of the fender itself.

In order to overcome the problems of both the pneumatic and hydraulic types of fenders it has been proposed to use a combination of these fenders for berthing a ship. Tests have shown that such a combination of marine fenders is effective when the ship impacts the fenders with an equal distribution of loading. It is very unusual, however, for a ship to berth with equal loading on each fender. Since angular berthing is the most common in practice the problem still exists of bursting the pneumatic type of marine fender.

The present invention has overcome the aforementioned problems by combining the pneumatic and hydraulic principles within a single marine fender. This has been accomplished by employing a pair of inflatable bags, one being an exterior bag and the other being a smaller interior bag which is located within the exterior bag. The interior bag, which is normally sealed when in use, may contain air and is sufficiently smaller than the exterior bag so as to define a chamber therebetween for containing water. A conduit means may be connected to and open into the exterior bag so as to communicate the water chamber with the exterior body of water. The present marine fender will absorb high impact loading without bursting because of the pressure relief caused by the escaping water through the conduit means. After berthing, the fender will provide even improved cushioning over the pneumatic type of fenders since the water discharge effect will minimize the high rebounding effect of the pneumatic bag.

Accordingly, an object of the present invention is to overcome all of the aforementioned disadvantages of the pneumatic and hydraulic types of marine fenders;

Another object of the present invention is to provide a marine fender which is capable of absorbing higher impact loads than the pneumatic fender without bursting;

A further object of the present invention is to provide a marine fender which is capable of absorbing high impact loads from a ship and yet after berthing the ship will exert low rebound forces thereon; and Other objects and advantages and novel features of the invention will become apparent from the following detailed description of the invention when considered in conjunction with the accompanying drawings wherein:

FIG. 1 is a side view of the marine fender in operation between a ship and a pair with the inflatable bags shown in cross section;

FIG. 2 is an enlarged side view of the marine fender with the inflatable bags shown in cross section; and FIG. 3 is a view taken along plane III—III of FIG. 2.

Referring now to the drawings wherein like reference numerals designate like or similar parts throughout the several views there is shown in FIG. 2 an exemplary marine fender 10 which includes a pair of inflatable bags 12 and 14, the bag 12 being located entirely within the bag 14. The interior bag 12 defines a chamber 16 which may contain air and is sufficiently smaller than the exterior bag 14 so as to define a chamber 18 which may contain water. As air hose may extend through both of the inflatable bags 12 and 14 and into the air chamber 16 so that the interior inflatable bag 12 may be inflated and deflated through a tube 20 having an air valve 22 therein which normally seals the bag.

The inflatable bags 12 and 14 may be generally cylindrical in shape and may be held in a generally concentric relationship by a support means. The support means may include a cable 24 which extends completely through the top and bottom ends of both of the bags with a means for connecting the cable to each of said bag ends. The means connecting the cable to the top and bottom ends of the interior inflatable bag may include opposite facing centrally flanged plates 26 which may be fixed in their opposed relationship by riveting to one another or bonding to the wall of the bag as illustrated in FIG. 2. The cable 24 may be rigidly secured within the plates 26 by crimping the flanged portions or spot welding. Similar plates 28 may be secured to the interior top and bottom ends of the exterior inflatable bag 14 and each of these plates may be opposed by a pad eye 30 on the exterior top and bottom ends of the bag. Each plate 28 and pad eye 30 combination may be secured together by riveting or bonding and the cable may be secured to the plates 28 in the same manner as they were secured to the plates 26. Further, the cable 24 may extend through each of the base plates of the pad eyes 30 and may have enlarged rivet head type end portions 32 for securing the pad eyes 30 in their spaced relationship, the upstanding flanges of the pad eyes 30 being notched out to provide space for the rivet head portions 32. With this construction, forces applied to either of the pad eyes 30 are transmitted through the cable 24 to the opposite pad eye without elongating the inflatable bags. This important advantage may be readily visualized by referring to FIG. 1 where the present invention is shown in operation.

In order to relieve the pressure on the inflatable bags when subjected to high impact loading a conduit means 34 is connected to and opens into the exterior bag 14 so as to communicate the water chamber 18 with the exterior body of water. The conduit means 34 may include a Y-shaped pipe 36 which is connected at the bottom end of the exterior inflatable bag 14 with both branches of the Y extending through the pad eye 30 and through the exterior inflatable bag 14 and the flanged plate 28. The pipe 36 may extend downwardly from the bottom of the exterior bag 14 and may be connected to the pad eye and plate by welding. A rubber hose 38 may be fitted at its top end over the bottom of the pipe 36 and may be fitted at its bottom end to a plastic water screen 40 which has an upper necked down tubular portion. The hose 38 may be secured to the pipe 36 and the water screen 40 by a series of hose clamps 42. The water screen 40 may have an enlarged tubular bottom portion which is closed at its bottom, this portion having a series of openings 44 in its side wall. The internal diameter of the hose 38 should be such that when high impact loads are subjected to the inflatable bags the air filled interior inflatable bag 12 is prevented from bursting.

It is desirable that the marine fender be capable of absorbing high impact loading in the order of 850 inch tons of a ship with a berthing velocity of approximately 1′/sec. without bursting the interior pneumatic bag 12. Such a loading condition would not be uncommon when a 17,000 ton displacement ship is berthed under conditions of wind gusts at 40 knots. With an outer bag 14 of a size of 40″ x 60″ and an inner bag 12 of a size of 24″ x 48″ the hose 38 should be approximately 4″ in diameter. The total area opening of the openings 44 should be at least equal to the internal diameter of the hose 38.

The marine fender may be secured to a pier or wharf 46 by a pair of anchoring chains which are connected to the pad eyes 30 and to the pier 46. As shown in FIG. 2, the water chamber 18 does not have to be completely filled with water and it may be desirable to provide an upper air space, as shown, for providing sufficient buoyancy to float the fender in the water. The inflatable bags 12 and 14 may be constructed from natural or synthetic rubber or even plastic. The cable 24 may be flexible or alternatively could be a rigid rod. Further, the interior bag 12 may be filled with many different types of foam rubber than being filled only with air.

FIG. 1 illustrates the marine fender 10 in operation when a ship 48 is coming alongside the pier 46. High pressure within the bags 12 and 14 will be relieved by discharge of the water chamber 18 through the openings 44 of the conduit means. After berthing, the interior pneumatic bag 12, in combination with the exterior bag 14, will provide a good cushioning effect between the pier and the ship. This is an improved cushioning effect over the prior art pneumatic fenders since the rebounding effect of the air cushion is reduced by the water discharging action.

It is now readily apparent that the present invention provides a marine fender which has improved performance over either of the prior art pneumatic or hydraulic type of fenders taken either alone or in combination. The water discharging action of the present marine fender relieves the pressure on both of the inflatable bags so that high impact loads may be absorbed without a bursting of either one of the bags. The present marine fender is an improved energy absorber for both small and large watercraft during berthing operations as well as after berthing.

I claim:

1. A marine fender comprising:

a pair of inflatable bags, one of which is normally sealed, one bag being an exterior bag and the other being a smaller interior bag which is located within said exterior bag;
the interior of said interior bag defining a fluid chamber and the interior bag being sufficiently smaller than the exterior bag so as to define another fluid chamber therebetween;
one of said chambers containing air and the other chamber being capable of retaining water; and
water communicating means connected to one of the bags for communicating the water chamber with an exterior body of water when said fender is disposed within said body of water,
whereby, upon impact of a ship with the fender, water can be expelled from the water chamber to prevent a bursting of the air filled chamber.

2. A marine fender as claimed in claim 1 wherein: the fluid chamber within said interior bag is filled with air.

3. A marine fender as claimed in claim 2 wherein: the fluid chamber between the interior and exterior bags contains a quantity of water.

4. A marine fender as claimed in claim 1 including:
a cable extending completely through both of said bags; and
means connecting the cable to each of the bags at the points where said cable extends through the bags.

5. A marine fender as claimed in claim 4 wherein:
the connecting means also connects the water communicating means to the bags; and
said water communicating means being a conduit which is capable of extending downwardly into said body of water.

6. A marine fender as claimed in claim 1 wherein: the water communicating means is capable of discharging water from the water chamber at a rate sufficient to prevent the air chamber from bursting when the fender is subjected to an impact load of approximately 850 inch-tons of a ship with a displacement of approximately 17,000 tons and a berthing speed of approximately 1 foot per second.

7. A marine fender comprising:
a pair of inflatable bags, one being an exterior bag and the other being a smaller interior bag which is located within said exterior bag and is normally sealed;
the interior bag containing air and being sufficiently smaller than the exterior bag to define a chamber therebetween for containing water; and
conduit means connected to and opening into the exterior bag for communicating the water chamber with an exterior body of water;
whereby, upon high impact of a ship with the fender, water can be expelled from the water chamber to prevent the interior bag from bursting.

8. A marine fender as claimed in claim 7 including: means concentrically supporting the interior bag within the exterior bag.

9. A marine fender as claimed in claim 8 wherein the support means includes:
a cable which extends through both of said bags and which is rigidly connected thereto.

10. A marine fender as claimed in claim 9 wherein: the support means is connected to and also supports said conduit means.

No references cited.

MILTON BUCHLER, *Primary Examiner.*

B. BELKIN, *Assistant Examiner.*